(12) United States Patent
Tan et al.

(10) Patent No.: US 10,127,510 B2
(45) Date of Patent: Nov. 13, 2018

(54) AGGREGATION-DRIVEN APPROVAL SYSTEM

(71) Applicant: Oracle International Corporation, Redwood Shores, CA (US)

(72) Inventors: Karlay Tan, San Carlos, CA (US); Sudhir Subramanian, Redwood City (CA); David Scott Merrill, Palo Alto, CA (US); Lee Hian Quek, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1011 days.

(21) Appl. No.: 14/449,733

(22) Filed: Aug. 1, 2014

(65) Prior Publication Data

US 2016/0034829 A1    Feb. 4, 2016

(51) Int. Cl.
*G06Q 10/06* (2012.01)
*G06Q 10/10* (2012.01)

(52) U.S. Cl.
CPC ....... *G06Q 10/0633* (2013.01); *G06Q 10/103* (2013.01)

(58) Field of Classification Search
CPC .............................. G06Q 10/10; G06Q 10/06
USPC ................. 707/601, 694, 718–720, 755, 829
See application file for complete search history.

(56) References Cited

U.S. PATENT DOCUMENTS

| | | | |
|---|---|---|---|
| 6,088,679 A | 7/2000 | Barkley | |
| 6,947,989 B2 | 9/2005 | Gullotta et al. | |
| 7,379,931 B2 | 5/2008 | Morinville | |
| 7,574,383 B1 | 8/2009 | Parasnis et al. | |
| 7,853,472 B2* | 12/2010 | Al-Abdulqader | G06Q 10/06 705/7.13 |
| 8,135,630 B2 | 3/2012 | Wadawadigi et al. | |
| 8,145,670 B2* | 3/2012 | Yasaki | G06F 21/6218 380/201 |

(Continued)

FOREIGN PATENT DOCUMENTS

WO    02069290 A2    9/2002

OTHER PUBLICATIONS

Oracle White Paper, "Setting Up Document Approvals", Oracle Fusion Procurement, Release 7, Oct. 2013.

(Continued)

*Primary Examiner* — Tony Mahmoudi
*Assistant Examiner* — Linh Black
(74) *Attorney, Agent, or Firm* — Potomac Law Group, PLLC

(57) ABSTRACT

A system is provided that manages aggregated information-driven approvals. The system creates an aggregation attribute that includes an aggregation function that automatically aggregates a plurality of data values into an aggregate data value for an attribute across a plurality of components of a document. The system defines an attribute identifier for the aggregation attribute, where the attribute identifier defines the attribute of the document whose data values are automatically aggregated by the aggregation function. The system further defines one or more filters for the aggregation attribute, wherein the one or more filters define the components of the document whose data values are automatically aggregated by the aggregation function.

15 Claims, 7 Drawing Sheets

(56) References Cited

U.S. PATENT DOCUMENTS

| | | | | |
|---|---|---|---|---|
| 8,204,809 | B1* | 6/2012 | Wise | G06Q 40/06 705/35 |
| 8,606,639 | B1 | 12/2013 | Sun et al. | |
| 9,245,291 | B1* | 1/2016 | Ballaro | G06Q 30/0635 |
| 2002/0069096 | A1 | 6/2002 | Lindoerfer et al. | |
| 2005/0278227 | A1 | 12/2005 | Esary et al. | |
| 2008/0300959 | A1 | 12/2008 | Sinha et al. | |
| 2009/0144178 | A1 | 6/2009 | Barwick et al. | |
| 2010/0306011 | A1* | 12/2010 | Correll | G06Q 10/06 705/7.36 |
| 2012/0290950 | A1* | 11/2012 | Rapaport | H04L 51/32 715/753 |
| 2013/0159060 | A1 | 6/2013 | Steinbach | |
| 2014/0279132 | A1* | 9/2014 | Guha | G06Q 30/0605 705/26.2 |
| 2014/0279694 | A1* | 9/2014 | Gauger | G06Q 40/06 705/36 R |
| 2014/0365348 | A1* | 12/2014 | Ballaro | G06Q 30/0601 705/30 |
| 2015/0363478 | A1* | 12/2015 | Haynes | G06Q 10/101 707/625 |

OTHER PUBLICATIONS

Oracle® Fusion Middleware Modeling and Implementation Guide for Oracle Business Process Management http://docs.oracle.com/cd/E28280_01/doc.1111/e15176/soa_app_mgmt_svc_bpmpd.htm, 2012.

Intelligent aggregation of purchase orders in e-procurement, http://ieeexplore.ieee.org/xpl/articleDetails.jsp?tp=&arnumber=1540665, last downloaded Jun. 18, 2014.

Enterprise Business Process Management—Architecture, Technology and Standards, http://link.springer.com/chapter/10.1007/11841760_1#page-1, last downloaded Jun. 18, 2014.

Controlling enterprise context-based session policy and mapping it to mobile broadband policy rules, http://ieeexplore.ieee.org/xpl/articleDetails.jsp?tp=&arnumber=6376025, last downloaded Jun. 18, 2014.

Seradex ERP Software, "Consignment and Vendor Managed Inventory Module", http://www.seradex.com/products/consignment_Inventory.php, p. 1-3, last downloaded Apr. 23, 2014.

QAD, "Materials Management Operations Guideline/Logistics Evaluation", http://www.qad.com/public/Documents/QAD_MMOGLE_V11.pdf, p. 1-31, last downloaded Apr. 23, 2014.

"Fishbowl Inventory Software", http://www.softwareadvice.com/scm/fishbowl-inventory-scm-profile/, p. 1-8, last downloaded Apr. 23, 2014.

"Data-Driven Vendor Managed Inventory—VMI—Programs from Field", http://fieldfastener.com/core-competencies/vendor-managed-inventory-programs-vmi/, p. 1-6, last downloaded Apr. 23, 2014.

"Procurement and Consumption of Vendor Consigned Inventory (779) SAP Best Practices Healthcare (U.S.)", http://help.sap.com/bp_hc603/BBLibrary/HTML/779_EN_US.htm, p. 1-6, last downloaded Apr. 23, 2014.

IBM White Paper, "IBM Cognos Supply Chain Analytics", Feb. 2009, p. 1-14, ftp://ftp.software.ibm.com/software/data/sw-library/cognos/pdfs/whitepapers/wp_supply_chain_analytics.pdf, last downloaded Apr. 23, 2014.

Sererra, "Vendor Managed Inventory or Consignment Sales", http://www.sererra.com/Sererra-VMI-Consignment-Sales-Netsuite, last downloaded Apr. 23, 2014.

Skyetek, "Consigned / Vendor-Managed Inventory for Medical Implant Distribution", http://www.skyetek.com/Portals/0/Documents/Solutions/Consigned%20and%20Vendor-Managed%20Inventory%20for%20Medical%20Implant%20Distribution.pdf, last downloaded Apr. 23, 2014.

Oracle Fusion Applications Procurement, "Oracle Fusion Purchasing", Oracle Data Sheet, 2012.

Oracle Fusion Procurement, The New Standard for Supply Management, 2010.

Rohit Lobo Prabhu et al., U.S. Appl. No. 14/261,501, filed Apr. 25, 2014.

* cited by examiner

AGGREGATION-DRIVEN APPROVAL SYSTEM

FIELD

One embodiment is directed to a computer system, and more particularly, to a computer system that manages approval of documents.

BACKGROUND

Corporate approval policies are becoming more and more complex due to stricter guidelines and regulations. For example, when a transaction is created, a requisition document can be created, where the requisition document includes multiple document lines with different commodities. Once the requisition document is created, the requisition document can be submitted for approval, where the approval of the requisition document can be governed by multiple approval policies that are different based on the different commodities of the requisition document. Ultimately, a purchase order can be created once the requisition document has been submitted and approved. However, approval tools used for routing documents within an organization typically do not provide flexibility in modeling complex policies.

SUMMARY

One embodiment is a system that manages aggregated information-driven approvals. The system creates an aggregation attribute that includes an aggregation function that automatically aggregates a plurality of data values into an aggregate data value for an attribute across a plurality of components of a document. The system defines an attribute identifier for the aggregation attribute, where the attribute identifier defines the attribute of the document whose data values are automatically aggregated by the aggregation function. The system further defines one or more filters for the aggregation attribute, wherein the one or more filters define the components of the document whose data values are automatically aggregated by the aggregation function.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, an aggregate-driven approval system is provided that can apply approval policies in the form of approval rules based on aggregated data values within a document that is submitted for approval. More specifically, the aggregate-driven approval system can define an aggregation attribute that defines an aggregation function that automatically aggregates data values (such as amounts) within the document into an aggregate value. The aggregate-driven approval system can then apply one or more approval rules to the aggregate data value, rather than the individual data values of the document. Thus, the aggregate-driven approval system can determine whether to approve the document based on the aggregate data value. Besides being able to aggregate data values across document components, the aggregate-driven approval system can filter document components using either (or both) attribute filters or hierarchical filters, which can greatly reduce the amount of setup that users are required to perform.

Figure 1:
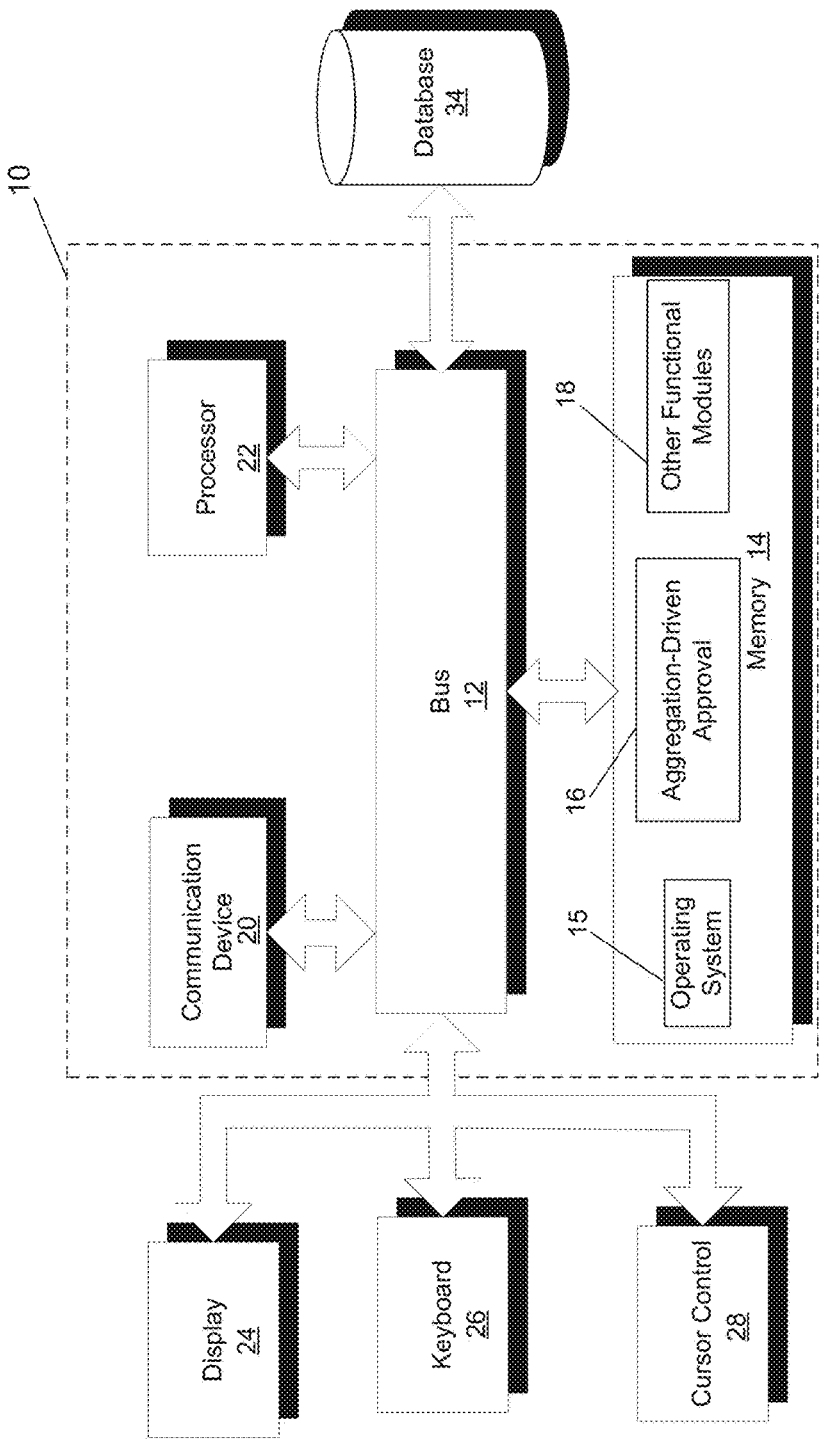
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, an aggregation-driven approval module 16, as well as other functional modules 18. Operating system 15 can provide an operating system functionality for system 10. Aggregation-driven approval module 16 can provide functionality for managing aggregated information-driven approvals, as further disclosed below. In certain embodiments, aggregation-driven approval module 16 can comprise a plurality of modules, where each module provides specific individual functionality for managing aggregated information-driven approvals. System 10 can also be part of a larger system. Thus, system 10 can include one or more additional functional modules 18 to include the additional functionality. For example, functional modules 18 may include modules that provide additional functionality, such as functionality of an "Oracle Fusion Self-Service Procurement" by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, it is a common requirement for users to be able to perform approvals based on aggregated data values (e.g., aggregated amounts) across one or more attributes of a document, where the document contains multiple document components (e.g., lines, schedules, or distributions). For example, Acme Corp.'s spending policy can include the following requirements: (1) if a total amount of one or more information technology ("IT") requests is less than $1,000.00, the IT manager is required to approve the IT request(s); (2) if the total amount of the IT request(s) is greater than or equal to $1,000.00 and less than $1,200.00, the IT manager and the IT director are required to approve the IT request(s); and (3) if the total amount of the IT request(s) is greater than or equal to $1,200.00, the IT manager, the IT director and the IT vice-president ("VP") are required to approve the IT request(s). An employee can submit the following requisition document containing three document lines for approval:

| Line | Description | Category | Amount |
|------|-------------|----------|--------|
| 1 | Dell computer | IT.Desktop | $599.00 |
| 2 | LCD monitor | IT.Desktop | $450.00 |
| 3 | Samsung Galaxy 3 | Telephony.cellphones | $299.00 |

To accurately determine the approvals required for IT requests within the aforementioned requisition document, an aggregation of the amounts of lines 1 and 2 should be used. However, if an approval system does not have the capability to aggregate the amounts of lines 1 and 2, the approval system is required to either: (a) evaluate the approval against each line amount; or (b) evaluate the approval against the total document amount. If the approval system evaluates the approval against each line amount, this will result in a fewer number of approvers than desired, since line 1 and line 2 are each less than $1,000.00 (meaning that only the IT manager will be required to approve the two IT requests, when it is desired that both the IT manager and the IT director approve the two IT requests). If the approval system evaluates the approval against the total document amount, this will result in a larger number of approvers than desired, since the total requisition amount is greater than $1,200.00 (meaning that the IT manager, the IT director, and the IT VP will be required to approve the two IT requests, when it is desired that only the IT manager and the IT director approve the two IT requests).

Currently, it is very difficult for users to model approval policies within existing approval systems that evaluate aggregated data values (e.g., amounts) across document components (e.g., document lines). Thus, users of existing approval systems typically are required to either: (1) evaluate approvals using the document total amount (which can include lines from other commodities, and which can lead to incorrect approval enforcement); (2) evaluate approvals based on each document line amount, without taking into consideration other lines within the same document (which does not always correctly reflect aggregated amounts, and which can lead to incorrect approval enforcement); or (3) implement custom computer program logic (such as customized procedural language/structured query language ("PL/SQL")) to handle such requirements (which can require substantial integration efforts to "pull in" the PL/SQL computer program code into the approval rules).

Thus, in one embodiment, an aggregate-driven approval system can be provided that allows a user to model approval rules that utilize aggregation amounts that represent aggregations of one or more data values of an attribute of a document across multiple components of the document. The aggregate-driven approval system can allow the user to setup an approval rule that utilizes one or more aggregation amounts using easy-to-use user interfaces. Subsequently, when a user submits a document for approval using the approval-driven approval system, the system can go through the document, generate the appropriate aggregate amount(s), and apply the approval rules to the aggregate amount(s).

According to an embodiment, a user can first create an aggregation attribute within an aggregate-driven approval system, where the aggregation attribute is a type of a user-defined attribute. The user can further create an approval rule within the aggregate-driven approval system that references the aggregation attribute. The aggregation attribute defines an aggregation function that automatically aggregates a plurality of data values into an aggregate data value for an attribute across a plurality of components of a document. More specifically, multiple data values can be defined for a specific attribute within multiple components (e.g., lines, schedules, or distributions of a document), where the aggregation function can automatically aggregate the data values. For example, the aggregation function can automatically aggregate data values for an attribute across document lines that include a specified data value for a category attribute. As another example, the aggregation function can automatically aggregate data values for an attribute across document lines that include a specified data value for a line type attribute. As yet another example, the aggregate function can automatically aggregate data values for an attribute across document lines that include a specified data value for a cost center attribute. The data values that are automatically aggregated for an attribute can be amount-based data values or other types of numeric data values.

In one embodiment, the aggregation function can receive the following input parameters: (a) an approval task which references a document type on which aggregation is to be performed; (b) a document identifier which identifies a document to perform aggregation on; (c) an attribute identifier which identifies an attribute to aggregate (such as an amount-based attribute); and (d) a set of filters which identify document components on which to perform aggregation on.

In accordance with an embodiment, a user can define an attribute identifier for the aggregation attribute. The attribute identifier defines an attribute of a document whose data values are automatically aggregated into an aggregate data value by the aggregate function. The attribute can be an amount-based attribute, or some other type of numeric attribute. An example attribute of a document that can be automatically aggregated is a line amount or a line quantity.

In accordance with an embodiment, a user can further define a set of one or more filters for the aggregation attribute. A filter defines a set of components (e.g., lines, schedules, or distributions) of a document whose data values are automatically aggregated by the aggregation function. An example of a filter is an attribute filter. An attribute filter defines the components of the document whose data values are automatically aggregated by the aggregation function based on whether a data value for a specified attribute of a component matches a specified data value. Thus, for an attribute filter, a user can specify an attribute of a document and can specify a data value. The attribute filter can then subsequently select the components of the document that include the specified attribute and that include the specified data value for the specified attribute.

Another example of a filter is a hierarchical filter. A hierarchical filter defines the components of the document whose data values are automatically aggregated by the aggregation function based on whether a data value for a specified attribute of a component is a parent data value or a child data value that is a child of the parent data value according to a specified hierarchy, where the specified hierarchy is associated with the specified attribute. Thus, for a hierarchical filter, a user can specify a hierarchy of data values that includes a parent data value and one or more child data values that are children of the parent data value for a specified attribute of a document. The hierarchical filter can then subsequently select the components of the document that include the specified attribute and that include either the parent data value of the or one of the child data values that are children of the parent data value for the specified attribute, as defined by the specified hierarchy. Examples of hierarchies that are often used for approval purposes are: a category hierarchy, a cost center hierarchy, and an accounting segment hierarchy.

Figure 2:
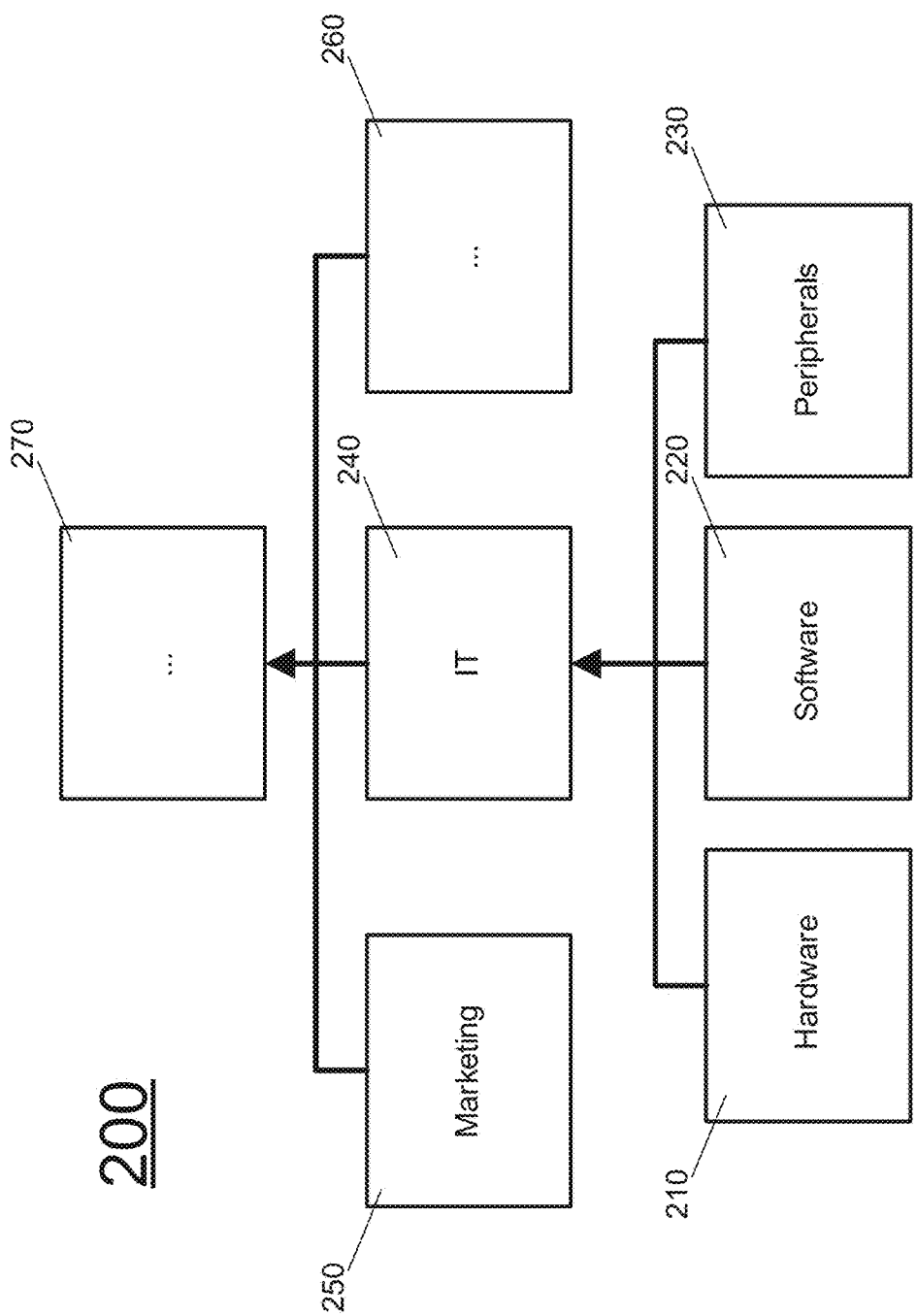
FIG. 2 illustrates an example of a hierarchical filter for an aggregation attribute according to an embodiment of the invention.

FIG. 2 illustrates an example of a hierarchical filter for an aggregation attribute according to an embodiment of the invention. A category hierarchy 200 is a hierarchy that is defined for a category attribute of a document. Category hierarchy 200 includes category data value 210 ("Hardware"), category data value 220 ("Software"), and category data value 230 ("Peripherals"). Category data values 210, 220, and 230 are all children of category data value 240 ("IT"), which is a parent data value (or rollup data value) of category data values 210, 220, and 230. Further, category data value 240, and other category data values (i.e., category data value 250 ("Marketing") and category data value 260), are all children of category data value 270, which is a parent data value of category data values 240, 250, and 260.

According to the embodiment, a hierarchical filter can be defined that specifies category hierarchy 200 as the hierarchy of the hierarchical filter. The hierarchical filter can select components of a document that include category data value 240 as a parent data value, and that further includes all the category data values that are children of category data value 240 (i.e., category data values 210, 220, and 230). For example, the following approval rules can be defined for a requisition document: (1) if a total amount for a category equal to "IT" is less than or equal to $500.00, route to IT manager for approval; and (2) if a total amount for a category equal to "IT" is greater than $500.00 and less than or equal $1,000.00, route to IT manager for approval, then route to IT director for approval. Based on category hierarchy 200, the hierarchical filter can "roll up" category data values 210, 220, and 230 (i.e., "Hardware," "Software," and "Peripherals") to category data value 240 (i.e., "IT"). Thus, if a requisition document is submitted for approval, an aggregation function for an aggregation attribute that includes the aforementioned hierarchical filter can aggregate the amounts for the requisition document components (e.g., lines) with category attributes that have the following data values, which are child data values of the parent data value "IT": "Hardware," "Software," or "Peripherals."

For example, the below requisition document can be submitted for approval in accordance with an embodiment:

| Line | Description | Category | Amount |
|---|---|---|---|
| 1 | Dell Computer | Hardware | $499.00 |
| 2 | LAN Cable | Peripherals | $ 15.00 |
| 3 | Notepad, College Rules | Paper products | $  3.99 |

According to an embodiment, an aggregation function for an aggregation attribute that includes the aforementioned hierarchical filter can aggregate the amount of line 1 ($499.00) with the amount of line 2 ($15.00) into an aggregate amount for an IT category ($514.00). More specifically, the hierarchical filter selects line 1 because line 1 has a category attribute with a data value of "Hardware" that is a child of parent data value "IT," selects line 2 because line 2 has a category attribute with a data value of "Peripherals" that is a child of parent data value "Peripherals," and does not select line 3 because line 3 has a category attribute with a data value of "Paper products" that is not a child of parent data value "IT." The aggregation function aggregates a data value of an amount attribute for line 1 ("$499.00") with a data value of an amount attribute for line 2 ("$15.00") into an aggregate data value ("$514.00"), and does not factor in an amount attribute for line 3 ("$3.99") into the aggregate data value. The approval rules can subsequently be applied to the aggregate data value.

Figure 3:
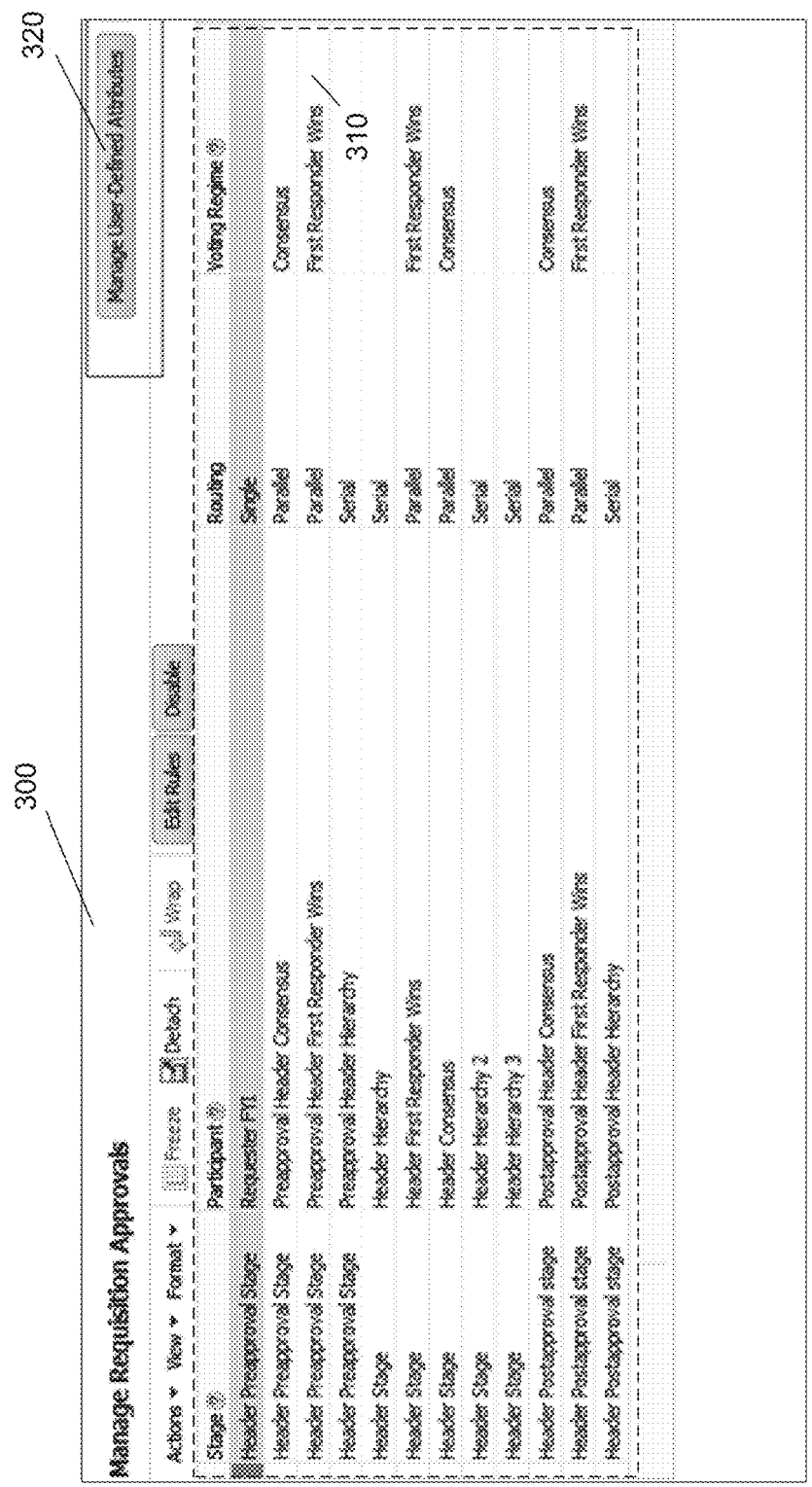
FIG. 3 illustrates an approval rule user interface for managing approval rules, according to an embodiment of the invention.

FIG. 3 illustrates an approval rule user interface 300 for creating and managing approval rules, according to an embodiment of the invention. Approval rule user interface 300 displays approval rules 310 which are approval rules created by a user. Approval rule user interface 300 further displays manage user-defined attributes button 320. By "clicking on," or otherwise selecting, manage user-defined attributes button 320, a user can access a user-defined attribute user interface (such as user-defined attribute user interface 400 of FIG. 4) for managing aggregation attributes, as well as other types of user-defined attributes. In managing aggregation attributes, a user can create new aggregation attributes, and can edit existing aggregation attributes.

Figure 4:
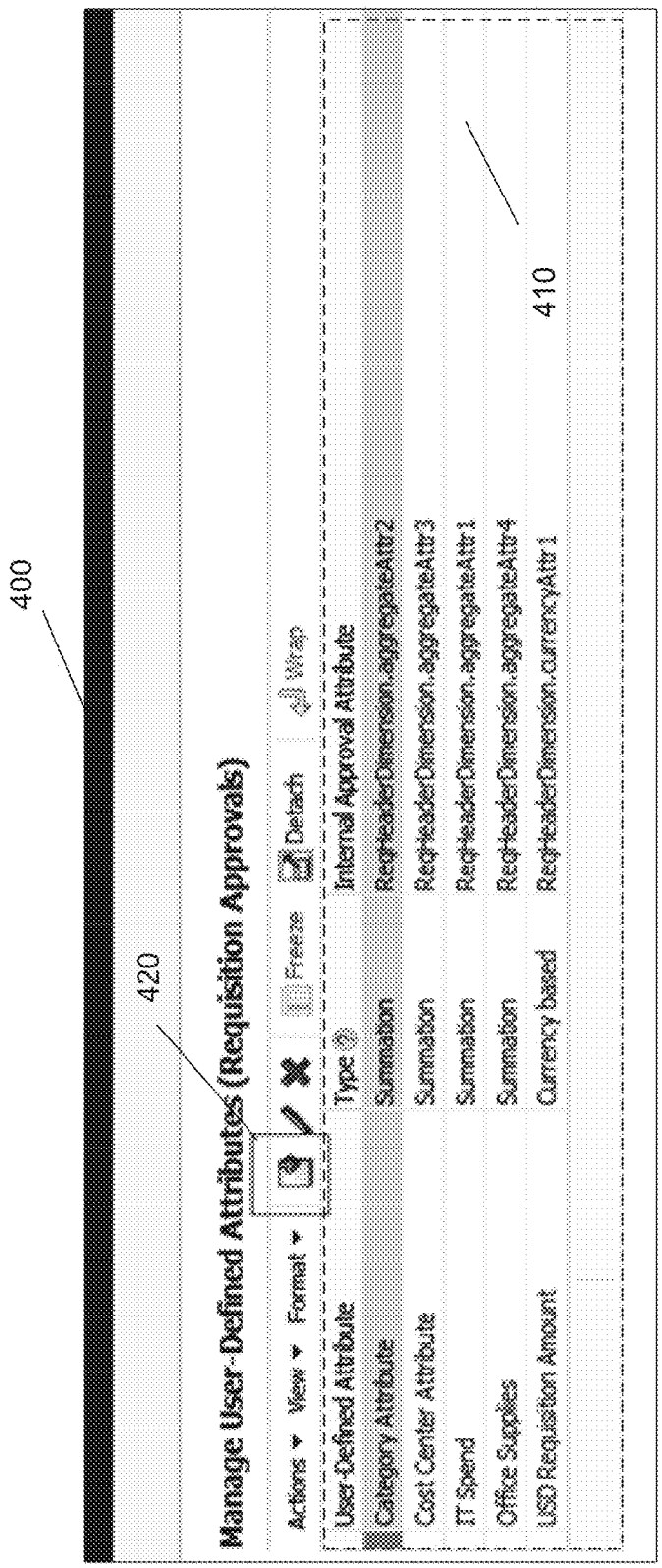
FIG. 4 illustrates a user-defined attribute user interface for managing user-defined attributes, according to an embodiment of the invention.

FIG. 4 illustrates a user-defined attribute user interface 400 for managing user-defined attributes, according to an embodiment of the invention. User-defined attribute user interface 400 displays user-defined attributes 410, which are attributes created by a user. An example of a user-defined attribute is an aggregation attribute (identified in FIG. 4 as a summation attribute). Another example of a user-defined attribute is a currency-based attribute which is an attribute governed by one or more currency rules. User-defined attribute user interface 400 further displays new user-defined attribute button 420. By "clicking on," or otherwise selecting, new user-defined attribute button 420, a user can access a user-defined attribute creation user interface (such as user-defined attribute creation user interface 500 of FIG. 5) for creating aggregation attributes, as well as other types of user-defined attributes.

Figure 5:
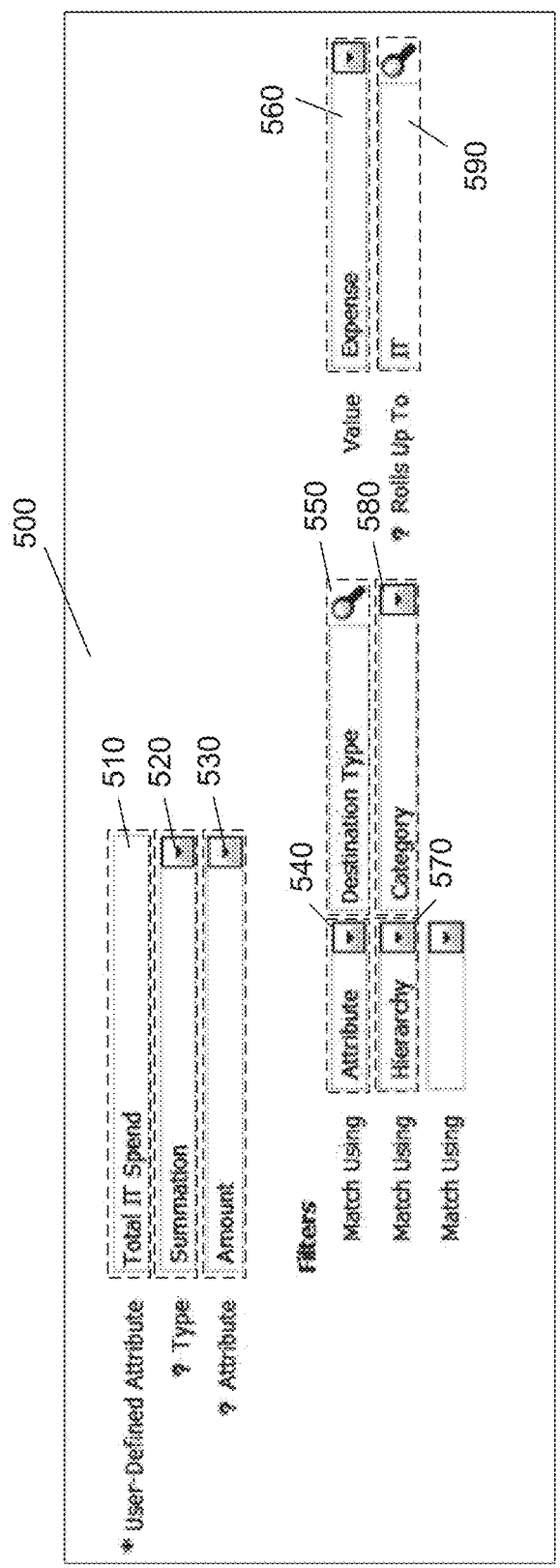
FIG. 5 illustrates a user-defined attribute creation user interface for creating user-defined attributes, according to an embodiment of the invention.

FIG. 5 illustrates a user-defined attribute creation user interface 500 for creating user-defined attributes, according to an embodiment of the invention. User-defined attribute creation user interface 500 displays user-defined attribute field 510. A user can input a name for the user-defined attribute within user-defined attribute field 510. User-defined attribute creation user interface 500 further displays type field 520. The user can select a type for the user-defined attribute within type field 520. An example type of a user-defined attribute is an aggregation attribute (identified in FIG. 5 as a summation attribute). In the illustrated embodiment, the user has selected an aggregation attribute as the type of user-defined attribute within type field 520. User-defined attribute creation user interface 500 further displays attribute field 530. The user can select an attribute identifier within attribute field 530, where the attribute identifier identifies an attribute of a document. In an embodiment where the user-defined attribute is an aggregation attribute, the attribute identifier further identifies an attribute of a document whose data values can be automatically aggregated by an aggregation function of the aggregation attribute. In the illustrated embodiment, the user has selected an amount attribute within attribute field 530.

In accordance with the embodiment, user-defined attribute creation user interface 500 further displays filter field 540. A user can create a filter for the user-defined attribute using filter field 540. More specifically, the user can select a type of filter within filter field 540. In the illustrated embodiment, the user has selected an attribute filter within filter field 540. User-defined attribute creation user interface 500 further displays attribute field 550. The user can input, or search for, an attribute of a document within attribute field 550. In the illustrated embodiment, the user has input, or located, a destination type attribute within attribute field 550. User-defined attribute creation user interface 500 further displays data value field 560. The user can select a data value within data value field 560. In the illustrated embodiment, the user has selected a data value of "Expense" within data value field 560.

In accordance with the embodiment, user-defined attribute creation user interface 500 further displays filter field 570. A user can create an additional filter for the user-defined attribute using filter field 570. More specifically, the user can select a type of filter within filter field 570. In the illustrated embodiment, the user has selected a hierarchical filter within filter field 570. User-defined attribute creation user interface 500 further displays hierarchy field 580. The user can select a hierarchy for an attribute of a document within hierarchy field 580. In the illustrated embodiment, the user has selected a category hierarchy for a category attribute within hierarchy field 580. User-defined attribute creation user interface 500 further displays parent data value (i.e., rollup data value) field 590. The user can input, or search for, a parent data value within parent data value field 590. In the illustrated embodiment, the user has input, or located, a parent data value of "IT" within parent data value field 590. In alternate embodiments, a user can create any number of filters for the user-defined attribute, and user-defined attribute creation user interface 500 can display any number of filter fields along with their corresponding fields based on the type of filter selected within the filter fields.

Figure 6:
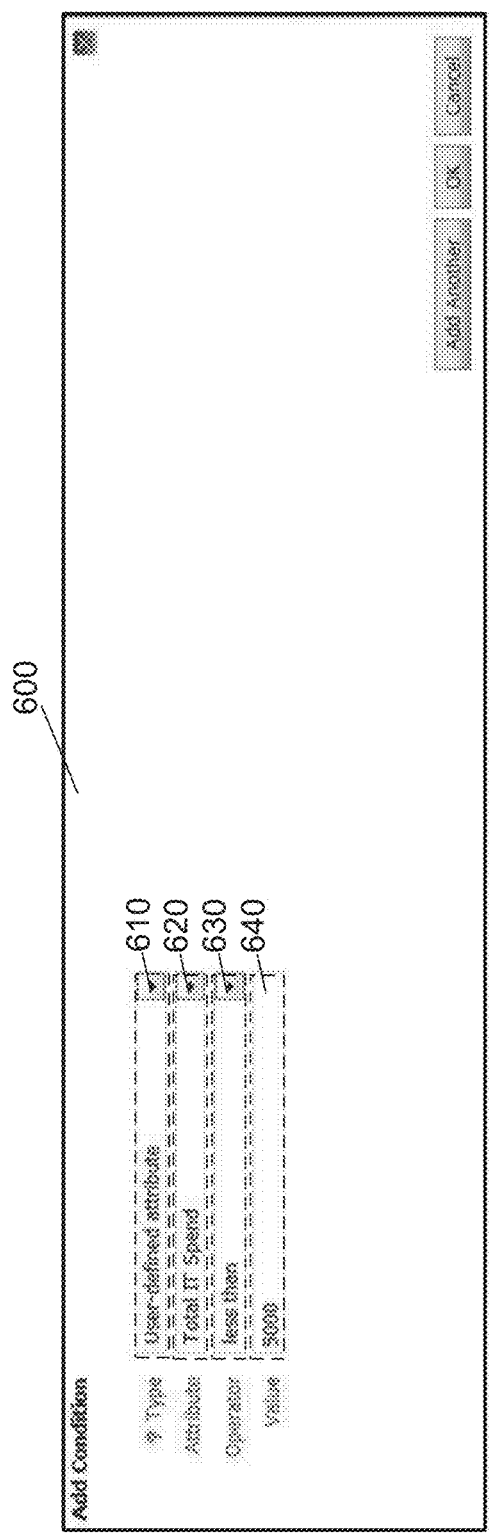
FIG. 6 illustrates an approval rule condition user interface for creating a condition for an approval rule, according to an embodiment of the invention.

FIG. 6 illustrates an approval rule condition user interface 600 for creating a condition for an approval rule, according to an embodiment of the invention. According to an embodiment, a user can create an approval rule using an approval rule user interface (not illustrated in FIG. 6). Further, the user can create one or more conditions for the approval rule using approval rule condition user interface 600. As previously described, a condition of an approval rule can reference an aggregation attribute. This can cause the approval rule to be applied to an aggregate data value automatically generated by an aggregation function of the aggregation attribute.

In accordance with the embodiment, approval rule condition user interface 600 displays type field 610. The user can select a type for the approval rule condition within type field 610. An example type of an approval rule condition is a user-defined attribute condition. A user-defined attribute condition is a condition that references a user-defined attribute, such as an aggregation attribute. In the illustrated embodiment, the user has selected a user-defined attribute condition as the type of approval rule condition within type field 610. Approval rule condition user interface 600 further displays attribute field 620. The user can select a user-defined attribute, such as an aggregation attribute, that the approval rule condition references within attribute field 620. In the illustrated embodiment, the user has selected the Total IT Spend attribute, which is an aggregation attribute, within attribute field 620. Approval rule condition user interface 600 further displays operator field 630. The user can select an operator that the approval rule condition uses to compare an aggregate data value of the aggregation attribute with a specified data value. In the illustrated embodiment, the user has selected the "less than" operator within operator field 630. Other operations can include an "equals" operator and a "greater than" operator. Approval rule condition user interface 600 further displays value field 640. The user can input a data value that the approval rule condition compares an aggregate data value with using the selected operator. In the illustrated embodiment, the user has input the data value 5000 within value field 640.

Thus, in one embodiment, an approval rule can be created that includes a condition that references an aggregation attribute. A document can be submitted for approval, and the approval rule can be executed. Before an evaluation of the condition for the approval rule, an aggregation function of the aggregation attribute can be implemented, and the aggregation function can automatically aggregate data values into an aggregate data value for an attribute across components of the document. The condition for the approval rule can then be evaluated using the aggregate data value. Thus, in this embodiment, an aggregation function of the aggregation attribute can always be implemented before an evaluation of a condition of an approval rule, even if the condition does not reference the aggregation attribute.

In an alternate embodiment, the document can be submitted for approval, and the approval rule can be executed, similar to the aforementioned embodiment. However, in this alternate embodiment, the condition for the approval rule can first be evaluated. In evaluating the condition, it can be determined that the condition references an aggregation attribute. When it is determined that the condition references the aggregation attribute, the aggregation function of the aggregation attribute can be implemented, and the aggregation function can automatically aggregate data values into an aggregate data value for an attribute across components of the document. The evaluation of the condition for the approval rule can then continue, where the aggregate data value is used for the evaluation. Thus, in this alternate embodiment, an aggregation function of an aggregation attribute need only be implemented when a condition that references the aggregation attribute is evaluated.

Figure 7:
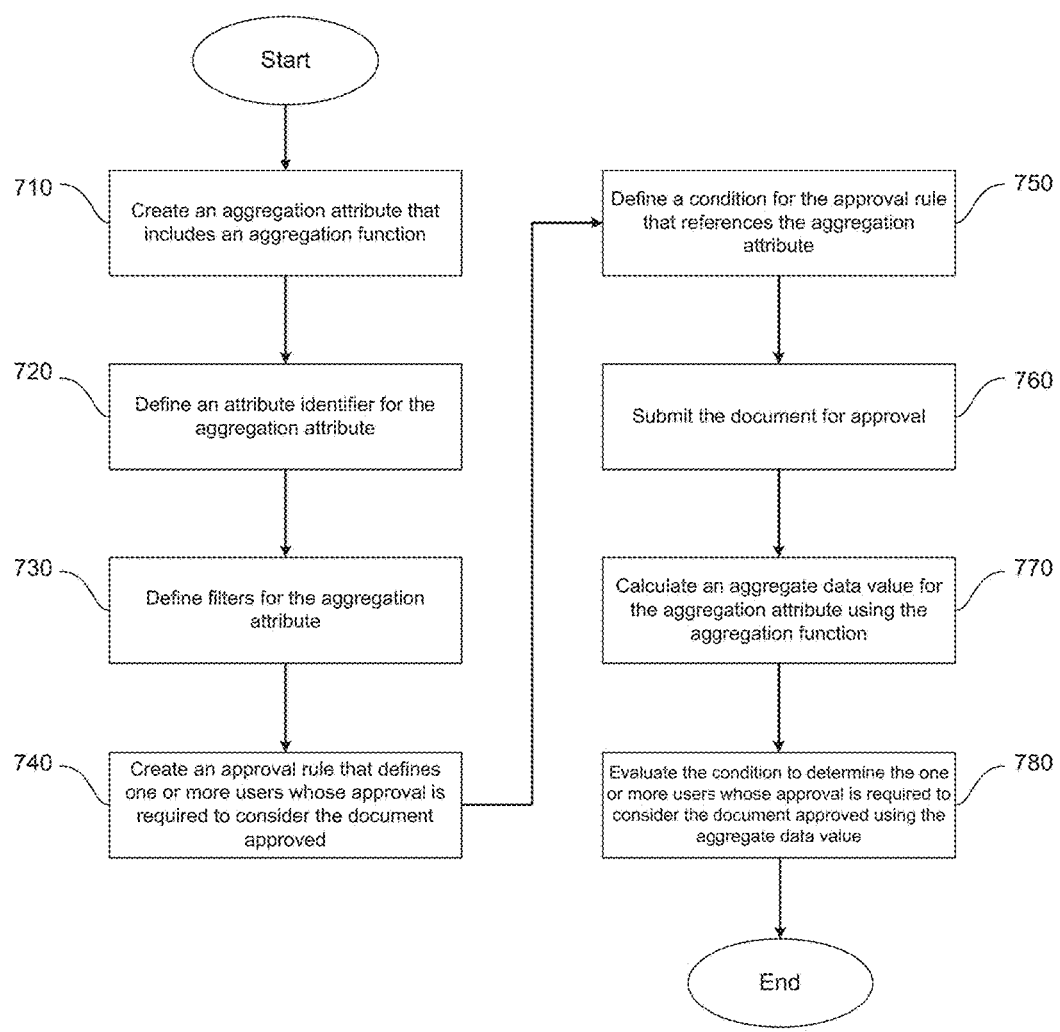
FIG. 7 illustrates a flow diagram of the functionality of an aggregation-driven approval module, according to an embodiment of the invention.

FIG. 7 illustrates a flow diagram of the functionality of an aggregation-driven approval module (such as aggregation-driven approval module 16 of FIG. 1), according to an embodiment of the invention. In one embodiment, the functionality of the flow diagram of FIG. 7 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins, and proceeds to 710. At 710, an aggregation attribute is created that includes an aggregation function that automatically aggregates a plurality of data values into an aggregate data value for an attribute across a plurality of components of a document. In certain embodiments, the components are lines of the document. Further, in some embodiments, the aggregation attribute can be created using a user-defined attribute user interface of a computer system. The flow then proceeds to 720.

At 720, an attribute identifier is defined for the aggregation attribute. The attribute identifier defines the attribute of the document whose data values are automatically aggregated by the aggregation function. The flow then proceeds to 730.

At 730, one or more filters are defined for the aggregation attribute. The one or more filters define the components of the document whose data values are automatically aggregated by the aggregation function. In certain embodiments, the one or more filters include an attribute filter that defines the components of the document whose data values are automatically aggregated by the aggregation function based on whether a data value for a specified attribute of a component matches a specified data value. Further, in some embodiments, the one or more filters include a hierarchical filter that defines the components of the document whose data values are automatically aggregated by the aggregation function based on whether a data value for a specified attribute of a component is a parent data value or a child data value of the parent data value according to a specified hierarchy. The flow then proceeds to 740.

At 740, an approval rule is created that defines whether approval from one or more users is required to consider the document approved. In certain embodiments, the approval rule can be created using an approval rule user interface of a computer system. The flow then proceeds to 750.

At 750, a condition is defined for the approval rule that references the aggregation attribute. The condition compares the aggregate data value of the aggregation attribute with a specified data value using an operator. The flow then proceeds to 760.

At 760, the document is submitted for approval. In certain embodiments, the document can be automatically submitted for approval within a computer system. The flow then proceeds to 770.

At 770, an aggregate data value is calculated for the aggregation attribute using the aggregation function. In certain embodiments, the aggregate data value can be automatically calculated for the aggregation attribute using the aggregation function within a computer system. The flow then proceeds to 780.

At 780, the condition of the approval rule is evaluated to determine whether approval from the one or more users is required to consider the document approved. In certain embodiments, the condition of the approval rule can be automatically evaluated to determine whether approval from the one or more users is required to consider the document approved within a computer system. Further, in some embodiments, the aggregate data value is calculated when the document is submitted for approval. In other embodiments, the aggregate data value is calculated when it is determined that the condition references the aggregation attribute. The flow then ends.

Thus, an aggregation-driven approval system is provided that can define an aggregation attribute that automatically aggregates data values within a document into an aggregate value, and can then apply one or more approval rules to the aggregate data value, rather than the individual data values of the document. Thus, the aggregation-driven approval system can provide a way for organizations to easily model their requirements for approval routing based on aggregated data values. Further, the aggregation-driven approval system and its corresponding user interfaces can be available for a user to easily set up approval rules to support such aggregation-driven requirements.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to manage aggregated information-driven approvals, the managing comprising:
receiving a selection of an aggregation type for a user selectable aggregation attribute;
creating the aggregation attribute of the aggregation type that comprises an aggregation function that automatically aggregates a plurality of data values into an aggregate data value for an attribute across a plurality of data elements of a data structure within a document;

defining an attribute identifier for the aggregation attribute, wherein the attribute identifier identifies a first attribute of the data elements within the document whose data values are automatically aggregated by the aggregation function of the aggregation attribute;

defining one or more filters for the aggregation attribute that define the data elements whose data values are automatically aggregated, at least a hierarchical filter defining a second attribute and a parent data value for the second attribute, the parent data value comprising one or more child data values according to a predetermined hierarchy, wherein data values are automatically aggregated across data elements that comprise the attribute identifier for the first attribute and parent data value or child data value for the second attribute; and processing a submitted data structure in a document to calculate an aggregated data value across data elements of the submitted data structure using the aggregation function, wherein the data structure comprises a subset of data elements with the attribute identifier for the first attribute and parent data values or child data values for the second attribute, and the aggregated data value aggregates data across the subset of data elements;

receiving a selection condition for an approval rule that models a multi-level approval policy of an organization comprising a plurality of approval processes, wherein the approval rule selection comprise a user-defined attribute condition;

creating the approval rule, wherein an approval rule condition for the approval rule that references the aggregation attribute is defined, and the approval rule condition compares the aggregate data value of the aggregation attribute with a data value using an operator; and based on a comparison between the aggregated data value and the approval rule, submitting the document using one of the approval processes indicated by the comparison.

2. The computer-readable medium of claim 1, wherein the aggregation attribute is created using a user-defined attribute user interface of a computer system.

3. The computer-readable medium of claim 1, wherein the approval rule is created using an approval rule user interface of a computer system.

4. The computer-readable medium of claim 1, the managing further comprising:

evaluating the approval rule condition of the approval rule to determine whether approval from one or more users is required to consider the document approved based on the modeled approval policies.

5. The computer-readable medium of claim 4, wherein the aggregate data value is calculated when it is determined that the approval rule condition references the aggregation attribute.

6. The computer-readable medium of claim 4,
wherein the document is automatically submitted for approval within a computer system;
wherein the evaluating the approval rule condition of the approval rule to determine whether approval from the one or more users is required to consider the document approved based on the modeled approval policies further comprises automatically evaluating the condition of the approval rule to determine whether approval from the one or more users is required to consider the document approved using the aggregate data value within the computer system.

7. The computer-readable medium of claim 1, wherein the one or more filters comprise an attribute filter that defines the data elements of the data structure whose data values are automatically aggregated by the aggregation function based on whether a data value for a specified attribute of a component matches a specified data value.

8. The computer-readable medium of claim 1, wherein the data elements comprises rows of a data structure and the attributes comprise columns of a data structure.

9. A computer-implemented method for managing aggregated information-driven approvals, the computer-implemented method comprising:

receiving a selection of an aggregation type for a user selectable aggregation attribute;

creating the aggregation attribute of the aggregation type that comprises an aggregation function that automatically aggregates a plurality of data values into an aggregate data value for an attribute across a plurality of data elements of a data structure within a document;

defining an attribute identifier for the aggregation attribute, wherein the attribute identifier identifies a first attribute of the data elements within the document whose data values are automatically aggregated by the aggregation function of the aggregation attribute;

defining one or more filters for the aggregation attribute that define the data elements whose data values are automatically aggregated, at least a hierarchical filter defining a second attribute and a parent data value for the second attribute, the parent data value comprising one or more child data values according to a predetermined hierarchy, wherein data values are automatically aggregated across data elements that comprise the attribute identifier for the first attribute and parent data value or child data value for the second attribute; and processing a submitted data structure in a document to calculate an aggregated data value across data elements of the submitted data structure using the aggregation function, wherein the data structure comprises a subset of data elements with the attribute identifier for the first attribute and parent data values or child data values for the second attribute, and the aggregated data value aggregates data across the subset of data elements;

receiving a selection condition for an approval rule that models a multi-level approval policy of an organization comprising a plurality of approval processes, wherein the approval rule selection comprise a user-defined attribute condition;

creating the approval rule, wherein an approval rule condition for the approval rule that references the aggregation attribute is defined, and the approval rule condition compares the aggregate data value of the aggregation attribute with a data value using an operator; and based on a comparison between the aggregated data value and the approval rule, submitting the document using one of the approval processes indicated by the comparison.

10. The computer-implemented method of claim 9, further comprising:

evaluating the approval rule condition of the approval rule to determine whether approval from one or more users is required to consider the document approved based on the modeled approval policies.

11. The computer-implemented method of claim 9, wherein the one or more filters comprise an attribute filter that defines the data elements of the data structure whose data values are automatically aggregated by the aggregation function based on whether a data value for a specified attribute of a component matches a specified data value.

12. A system for managing aggregated information-driven approvals, the system comprising:
   a processor coupled to non-transitory memory;
   an aggregation attribute creation module, in communication with the processor, configured to:
      receive a selection of an aggregation type for a user selectable aggregation attribute; and
      create the aggregation attribute of the aggregation type that comprises an aggregation function that automatically aggregates a plurality of data values into an aggregate data value for an attribute across a plurality of data elements of a data structure within a document;
   an attribute identifier definition module, in communication with the processor, configured to define an attribute identifier for the aggregation attribute, wherein the attribute identifier identifies a first attribute of the data structure within the document whose data values are automatically aggregated by the aggregation function of the aggregation attribute; and
   a filter definition module, in communication with the processor, configured to define one or more filters for the aggregation attribute that define the data elements whose data values are automatically aggregated, at least a hierarchical filter defining a second attribute and a parent data value for the second attribute, the parent data value comprising one or more child data values according to a predetermined hierarchy, wherein data values are automatically aggregated across data elements that comprise the attribute identifier for the first attribute and parent data value or child data value for the second attribute; and
   processing a submitted data structure in a document to calculate an aggregated data value across data elements of the submitted data structure using the aggregation function, wherein the data structure comprises a subset of data elements with the attribute identifier for the first attribute and parent data values or child data values for the second attribute, and the aggregated data value aggregates data across the subset of data elements;
   an approval rule creation module configured to:
      receive a selection condition for an approval rule that models a multi-level approval policy of an organization comprising a plurality of approval processes, wherein the approval rule selection comprise a user-defined attribute condition;
      create the approval rule, wherein an approval rule condition for the approval rule that references the aggregation attribute is defined, and the approval rule condition compares the aggregate data value of the aggregation attribute with a data value using an operator;
   based on a comparison between the aggregated data value and the approval rule, submitting the document using one of the approval processes indicated by the comparison.

13. The system of claim 12, the system further comprising:
   a condition evaluation module configured to evaluate the approval rule condition of the approval rule to determine whether approval from one or more users is required to consider the document approved based on the modeled approval policies.

14. The computer-implemented method of claim 9, wherein the data elements comprises rows of a data structure and the attributes comprise columns of a data structure.

15. The system of claim 12, wherein the data elements comprises rows of a data structure and the attributes comprise columns of a data structure.

* * * * *